United States Patent Office 3,354,245
Patented Nov. 21, 1967

3,354,245
METHOD AND COMPOSITION OF MATTER FOR FORMING CERAMIC STRUCTURES
Harley Banner Foster, 102 Elmwood, Greensboro, N.C. 27408
No Drawing. Filed Mar. 3, 1967, Ser. No. 620,281
33 Claims. (Cl. 264—60)

ABSTRACT OF THE DISCLOSURE

The composition for ceramic ware is disclosed herein to contain fly ash, water, and a low melting ceramic binder phase material which has a Pyrometric Cone Equivalent falling within the inclusive range of 022 to 07 and which is selected from the group consisting of ceramic frits and naturally occurring sodium borates. The fly ash, water and ceramic binder phase material are mixed together and the green ware formed from the mixture is fired to the PCE of the binder phase material. In place of fly ash, a refractory phase material such as brick bats may be used, the amount of binder phase introduced into this mixture being sufficient to fill the voids between the refractory phase particles.

---

This is a continuation-in-part of my copending application Ser. No. 413,360 filed on Nov. 23, 1964 for Ceramic Concrete Building Panels and Method of Making Same and of my copending application Ser. No. 490,080 filed on Sept. 24, 1965 for Method and Composition of Matter for Forming and Firing Lightweight Structural Ceramic Ware, the former being a continuation-in-part of my now abandoned application Ser. No. 213,114 filed on July 30, 1962.

The present invention relates to ceramic ware and more particularly to compositions of matter and methods for forming structural ceramic ware.

The present invention is particularly concerned with the achievement of finding a use for a man-made raw material that to date has been much discussed and cursed in the literature; yet, little has actually been done about this material in the commerce of the market place. This material is one that is called fly ash. Fly ash is the unfortunate by-product of any coal burning operation, and, in stationary electrical power plants, the accumulation of fly ash is a problem of some moment. With the continuous consumption of tons and tons of coal, it is elementary that the ash from this primary source of energy is a waste material, the accumulation of which, presents a storage problem. The present invention provides for a large, continuous, and profitable use for fly ash to thus solve these accumulation and storage problems.

Coal, as it is mined from the ground, contains a quantity of shale. Shale is a sedimentary rock, comprised primarily of consolidated clay particles, and these clay particles are, by definition, primarily alumino-silicates. Even the best quality of coal contains a measurable amount of shale, and this shale is usually reported as "ash" in any coal analysis. Power plants and the like, which consume large quantities of coal, especially powdered coal, produce correspondingly large quantities of two types of waste material, namely coal ash dust commonly called fly ash, and slag, commonly called just plain ash. The fly ash, however, is the finely divided ash material which is carried from the furnace by stack gases and is collected as it leaves the furnace in electrostatic precipitators, or other types of collectors. A small or lesser portion of the total ash in the coal does not leave the furnace with the stack gases as floating ash. This ash that remains in the furnace, instead of being fly ash, is called slag. This material while molten in the combustion chamber is cooled by being dropped into water underneath the combustion chamber, and this portion of the ash, called slag, therefore is far greater in particle size than the fly ash. Both the slag and fly ash are stored in separate ponds much like the tailings pond that are most common to the well known ore or mineral beneficiation plants.

The problem involved in disposal of the fly ash and slag is very great because the tonnage produced in some of the public and privately owned utility power plants is very high. Numerous attempts have been made to utilize this material, both slag and fly ash, most of the efforts being directed towards the preparation of concrete compositions in which the fly ash has been used as an extender or admixture and as a replacement for Portland cement. Basically, the theory behind the use of fly ash in cementitious mixtures, as a Portland cement partial replacement, is found in the well known pozzolanic effect, such an effect being used by the early Romans in constructing cementitious structures. Another attempt to utilize fly ash, this time in a ceramic composition bonded together by thermal energy instead of a hydraulic cementitious binder, is found in United States Letters Patent 2,576,565 issued to C. R. Brown on Nov. 27, 1951. This patent discloses the method of utilizing the fly ash, as a ceramic binder phase material, mixed with "refractory" slag, said slag being of a much larger initial particle size than the fly ash. By employing the fact that the slag—which incidentally has the same fusion point as the fly ash since both of these materials are comprised of the very same ingredients—is of a larger particle size, namely —10 +60 mesh Tyler Standard, as compared to the previously ground —325 mesh, Tyler Standard, particle size of the fly ash, patentee Brown is able to thermally fuse the fly ash particles by thermal treatment prior to the thorough fusing of the slag particles. Hence the Brown patent amounts to a teaching of using the fly ash material as a binder phase ceramic material for slag particles.

Still another attempt to solve the problem of slag accumulation is found in the common place name most laymen give to the everyday familiar concrete "cinder" block. When these blocks were first introduced to the construction industry, it was in vogue to use the slag particles (cinders) as the aggregate constituent in this ware. However, it was the popularity of concrete block in the market place that drove the block manufactureres to look for a more stable source of raw material supply since it is quite obvious that the slag particles of power plant accumulation represent only the smallest fraction of the slag-fly ash accumulation. This is because most power plants use powdered coal in their combustion chambers. Hence, there is a preponderance of fly ash in comparison with slag particles. Consequently, this gave "cinder" block manufacturers only a small portion of the total ash accumulation, which was of the proper particle size needed, namely ⅜" to dust. This exhaustion of the slag source gave rise to an increase in the manufacture of lightweight aggregate, the production of which has subsequently taken over the concrete block aggregate market. All during this time, the major source of ash from power plants, it being by-in-large fly ash, continued to accumulate.

Turning to the problem at hand, fly ash and its use in a novel ceramic piece of ware, it is significant to note that fly ash is essentially glass. To be sure, it is extremely lightweight glass, since it is, if one were to examine an individual particle, highly porous, which results from the simultaneous glass and gas formation during its genesis. The glass being highly viscous allows the thus simultaneously produced gas to be expelled, thereby resulting in a vesicular character, much like that exhibited by the volcanic igneous rock called scorria. However, the carbonaceous material, the source of the gas, is not, unfortunately, always completely combusted and fly ash normally has a carbon content that falls within the inclusive range of 1 to 25% by weight. This incomplete combustion is explained, at least to some extent, by the very short time of exposure these particles receive in the 3000° F. combustion chambers of stationary power plants. It has been proposed that it is this carbon content that mitigates inter alia, property. Such frits are well known in the ceramic industry and have been in commerce for many years. For example, Pemco Corporation, Baltimore, Maryland is one of the well known suppliers of ceramic frits, and, the following table of different frits show a sample of the compositions that were found to be practical when used in this invention.

| Frit No. | Melting Point, ° F. | $K_2O$ | $Na_2O$ | CaO | SrO | $B_2O_3$ | $Al_2O_3$ | $SiO_2$ |
|---|---|---|---|---|---|---|---|---|
| P926 | 1,500 | 0.01 | 0.31 | 0.68 | | 0.16 | 0.11 | 1.9 |
| PS30 | 1,500 | | 0.65 | 0.35 | | 0.84 | | 2.54 |
| P786 | 1,800 | 0.09 | 0.09 | 0.58 | 0.24 | 0.36 | 0.19 | 2.80 | against fly ash and its use in cementitious mixtures as a partial replacement for Portland cement.

However, in the present invention, the carbon content of fly ash is of little or no moment, thereby avoiding this inherent problem found in prior uses of fly ash. Broadly, this invention turns contrary to the prior art teachings and uses the fly ash particles as a grog or refractory phase, not as a binder phase constituent as the prior art (Brown) does. Furthermore, this invention provides for the rapid and immediate firing of fly ash ceramic ware to temperatures so low that it is possible for the ware to be fired on the very same metallic pallets which carried them away from a forming mechanism. In addition, it has been found that a most rapid firing can be accomplished on a schedule that is finished, i.e. from green ware to fired ware, on the order of four hours, not three days or longer. In summary, the procedure and composition of matter according to this invention enables the complete manufacture of structural ceramic ware in a half working day or shorter. Ware that was made at the start of a working shift thus would be ready to be put into a structural load bearing wall within four hours or less. This is in comparison with the three or more days that it takes to form, dry and fire a common brick, or, to the approximately same amount of time to form and autoclave a concrete block. From the foregoing, the advantages, the utility, the step forward, the inherent competitive edge in manufacturing procedure is self-evident, the problem of vast accumulations of fly ash ponds being solved as a concurrent benefit.

As mentioned previously, fly ash is essentially a vesicular glass, and this glass is normally accumulated in particles that measure about 100% —10 mesh, Tyler Standard, and less. Fly ash possesses a fusion point that falls within the inclusive range of 5 to 15 PCE (Pyrometric Cone Equivalent). Stated in an alternative, but less technically correct manner, fly ash has a fusion point that falls within the inclusive temperature range of 2200° to 2600° F. The term PCE carries the inherent concept of heat-work or time temperature, which the recitation of mere temperature alone does no convey. Hence, to be ceramically correct, the term PCE will be used to designate not temperatures per se, but also time plus temperature or a heat-work relationship. For a complete meaning of the well known term of PCE and the method of determining same, ASTM Designation C 24-56 sets forth presently accepted U.S. practice in this particular area and is herein incorporated by reference.

In practice, this invention contemplates providing fly ash, straight from a storage pond, screening such a fly ash to render the material essentially 100%—10 mesh, Tyler Standard, adding to this thus screened material water up to 10% by weight, preferably around 4 to 8%, and then there is added to this mixture, either simultaneously with the water or subsequently thereto, 4 to 12 weight percent of a ceramic flux material whose PCE is within the inclusive range of 022 to 07. Generaly, this flux material is a frit material; that is, a glass whose PCE is known, predictable, and usually is man-made for that particular, The above compositions are based on the common place molar ratio used in expressing frit compositions in the ceramic literature.

Thus, all that is required to make lightweight ceramic ware according to this invention is to add the frit that will meet economic and pyrochemical (i.e., PCE) requirements to the wet or dry fly ash particles, to form the resulting mixture to a piece of ware, and then to fire immediately the thus formed ware, while it is still on a pallet that takes the green ware away from the molding station, to the fusion point, or rather the PCE, of the frit employed. The frit is used in any quantity from 4% upwards by weight and such frit is also used in the particle size generally around —100 mesh Tyler Standard. Larger frit particle sizes could be easily used, but since the fly ash particle size is —10 mesh, it is advantageous to use a —100 mesh frit particle size since one can get a more economical surface area coverage of the fly ash particles per weight of frit used by using the smaller frit particles. This makes for a stronger fired body due to a more homogenous distribution of the frit pyrochemical bonding ceramic particles over the surface of the fly ash particles.

It will be noted that in the above described procedure, there is not mentioned any use of a dry strength binder. It is normal and to be expected that in using all gritty, harsh, non-plastic materials like unto those used in this invention, some form of dry strength binder must be used. Such was the thinking prior to this invention, since, in the prior art it was the thinking and practice that a green piece of ceramic ware had first to be dried of all its water, and then fired. Such a drying step involved at least one handling step, and it is clear that every time a piece of ware has to be handled, money and time are lost. Such is not the case in the instant invention. The drying step and its attendant problems are essentially eliminated. There is no handling problem at all. Furthermore, there is not any binder material that has to be burned out during firing. Binders, according to the present invention are eliminated deliberately since they are not needed. This not only eliminates the handling and burning out problem, but also eliminates the cost of the dry strength binder material itself.

Since the frit is a glass, by definition it has itself already been fired at least once. Also, the fly ash is glass, since it was fired during its genesis. Consequently, there is nothing within the formed green ware of this invention that will slow down a firing schedule due to shrinkage considerations or volatile material expulsion except for the small amount of water, generally around 6–8% by weight, and the carbon which failed to be expelled from the fly ash during its formation. Therefore, a green piece of ware made from all previously fired, calcined, harsh, gritty, non-plastic material can be rapidly fired just as fast as the refractories forming a kiln can stand, if a periodic thermal chamber is used. However, if a tunnel kiln is employed, which is the preferred embodiment, then the ware rate of travel through the tunnel kiln is predicated only on the considerations of (1) expelling any residual carbon that may still be left in the fly ash, (2) expulsion of the small amount of water used, i.e. the 6–8% by weight used in forming, and (3) heat transfer considerations to penetrate the requisite thermal energy throughout the entire piece of ware in order to convert the frit, and the frit *only*, to a viscous pyroplastic state. If it is desired to expel, for some reason, the remaining carbon in the fly ash, there can be a "soak" in the firing schedule, that is, a holding constant of the temperature at or near the 1000° F. level for a given time. This soak falls within the inclusive time range of 15 minutes to two hours before thermally proceeding onto the frit binder phase PCE. Of course, it is to be pointed out that the lowest cone contemplated is cone 022 which approximates 1085° F., and a frit binder phase PCE range as herein disclosed does not preclude the 1000° F. pause for any desired expulsion of carbon. It is also to be pointed out that the atmosphere during firing is obviously generally on the oxidization side, but this does not by any means preclude other atmospheres if the oxygen is not needed to combust and thereby expel the carbon in the fly ash. It is also to be noted that the PCE range of the frit binder phase material, being within the 022 to 07 PCE range, allows the use of ordinary mild steel pallets as a means on which to rest the green ware, not only while the ware is being formed or carried away from the forming stage, but also all during the firing cycle. Only after the ware is fired is the ware removed from the pallet and the pallet is then returned to a proper station for re-use. Obviously, combustible pallets could also be used such as kraft paper and cardboard.

Heretofore, the frit ceramic binder phase used has been disclosed as a frit, i.e., a glass, normally man-made. However, one particular embodiment of this invention does not use such a material. Instead of such a frit, there is used a man processed, not man constructed or made, but naturally deposited sedimentary borax. Such a product is sold by the U.S. Borax Company under the name of Rasorite 46 and 65. Rasorite 46 is a 100%–14 mesh sodium borate with a minimum of 46% weight percent $B_2O_3$ content, and, Rasorite 65 is a finer grained and more concentrated form of sodium borate than Rasorite 46, it being 100%–100 mesh and a minimum of 65% $B_2O_3$. Although both of these products are soluble in water, they do not result in any dry strength binding property upon drying an aqueous suspension of fly ash, water and sodium borate. It is quite feasible to use the 100% –100 Tyler Standard mesh sodium borate as it is, i.e. in the dry state; however, it is obvious that a water solution, either hot or cold, could be made by first dissolving the requisite sodium borate in the desired amount of water and then mixing this solution with the right weight percentage of fly ash, both the fly ash content and water sodium borate solution being calculated to result in a mixture that has a water content that falls within the inclusive range of 6–8% weight percent, and a sodium borate weight percentage that is at least 4 weight percent.

Inasmuch as the sodium borate has a fusion point in the proximity of 1400° F., it is clear that it is to this temperature that any fly ash-sodium borate ware is fired. Such a sodium borate flux pyrochemically acts exactly like a frit in that the very same firing schedules can be used in firing this flux binder as that practiced in the embodiment employing frit ceramic binder phase components. Consequently, for the purposes of this disclosure, low melting, naturally occurring borax fluxes which are or may be man processed are looked upon as equivalents and a synthetic genus.

The water content, as set forth previously, naturally controls the method of forming the fly ash ware. By using only 4 to 10% by weight water, such amounts exclude— especially in view of the fact that the fly ash and flux frit ceramic binder phase is harsh, gritty, and non-plastic— extrusion methods to the untrained eye. However, it is possible to extrude all harsh gritty material with an approximate 10% water content using high frequency vibrators on the die member and/or extruder barrel. Even though this is possible and practicable it is not the preferred way because of the higher (10%) water content that is a must to act as an extrusion medium. Besides, when extruding essentially fly ash per se, the particle size of the fly ash should be as small as possible, namely in the 100%–200 Tyler Standard range.

Either dry pressing, which is an old well recognized concept, or hydrostatic pressing, which per se is also an old recognized concept, are the preferred modes of forming. In the aforesaid Brown patent, dry pressing fly ash bodies is mentioned, but prior to this invention there is no mention of hydrostatically forming fly ash, even though this mode of forming has been applied to clay members and the like. Since both of these methods of forming require a minimum of water, this characteristic is most compatible with the method of making ceramic wares according to this invention. The less water that is used, the less water that has to be expelled during the subsequent thermal pyrochemical bonding treatment. Consequently, the less water that is used the faster the firing schedule that can be used. Since the same pallet may be used to support the green ware at all times from mold stripping to completion of the pyrochemical bonding thermal treatment in accordance with this invention, no dry strength binder is necessary or even needed other than this small amount of water.

Basically there are two modes of dry pressing that are employable in making ceramic ware within the parameters of this invention. One is the conventional metallic die box in which the material to be molded is placed and is subsequently compressed by a metallic die plunger or plungers. Another is the concept of a rubber or elastomeric member defining one surface of a mold cavity in which the material to be molded is placed, and the molding pressure is applied by mechanical means to the elastomeric member, thereby collapsing the elastomeric member around the material undergoing molding.

As to the hydrostatic method of forming, this invention contemplates a hydrostatic mold which comprises an outer non-porous rigid shell member with a flexible elastomeric inner mold member deposited inside of the outer rigid mold shell. A hydraulic chamber is thus formed between the rigid member and delimited by the elastomeric member. Into such an open mold cavity formed by the elastomeric and outer porous members there is deposited in contact with the elastomeric member, the fly ash-frit or flux-water mixture. The mold is then closed, and subsequently the aforementioned hydraulic chambers are filled with fluid under pressure which in turn imparts a molding pressure onto the thus deposited fly ash. After the ware is formed, the hydraulic pressure is released, thereby allowing the elastomeric member to pull away from the thus formed body, the mold opened, and the thus molded body is stripped or allowed to fall out of the mold cavity onto a pallet, on which said body will stay until it has finished its sebsequent thermal treatment.

In either the dry pressing method or hydrostatic methods as set forth above, it is contemplated that, during the molding stage, there can be used in the mold cavity, core members which are either rigid or elastomeric in nature. If the core member is also elastomeric, said core member can be provided with a rigid internal member placed inside said elastomeric core member. Such a rigid member would be provided with duct members communicating with the inner surface of the elastomeric core member on the one hand, and on the other hand, communicating also with a source of hydraulic fluid. Such an arrangement would enable the elastomeric core member to also be responsive to any hydrostatic fluid pressure applied thereto during a molding step. Such a force, coming from a core member, would act upon the material that was being molded and against an outer rigid mold member that would be either porous, i.e. made of sintered metal or non-porous. Such a molding force, coming from the core member, would naturally compress the thus molded material against the outer rigid porous or non-porous mold member. In short, its effect would be like using a porous rigid outer mold member, a vacuum can be applied thereto which will enable removal of any forming water that is at or near the outer ware surface.

Furthermore, it is quite obvious, to a skilled worker, that during the filling of the mold, there can be applied vibrational energy to the mold cavity. This allows for a more even fill of the mold. Additionally, during the actual application of the molding forces, be they either mechanically or hydraulically applied, the simultaneous application of vibration has been found effective if applied at this time. Vibration plus a molding force makes a much more effective use of the small amount of water present in that it facilitates the rearrangement of the particles, during molding, into a configuration of least free energy. This results in a more compact and stronger piece of both green and fired ware. Vibration energy applied to a mass that is undergoing molding forces, for some strange reason, causes any water in said mass to seek the source of vibrational energy. Consequently, there is a water rich layer, in comparison to the rest of the resulting green ware, at, near, and on the surface of ware that has been thus molded. Since all water has to be and is expelled during thermal bonding of the ware, this bringing the water to the surface of the ware greatly facilitates its removal, especially on a fast firing schedule. By the outer mold member being porous, i.e. formed of sintered metal particles, a vacuum can be applied thereto during the vibration application, thereby resulting in an additional removal of forming water from the green ware undergone molding forces.

It is apparent, inherent, and it naturally follows from the foregoing disclosure of the manner of forming and firing the composition of fly ash and frit, that the present invention has as one of its basic parameters, the concept that the ware thus formed is fired, on a pallet, in a kiln, the ware being stacked therein being essentially only slightly greater than one unit high. This is apparent from the fact that there is no dry strength to speak of in the dry ware. In firing the ware in a tunnel kiln, it is contemplated that either a plurality of side-by-side pallets be traversed either by pushing or by pulling same through the tunnel, or that a single pallet will be pushed or pulled through said tunnel. In such tunnel kiln operation, the kiln need not be the expensive large cross-section kiln now in commercial vogue. The cross-section of the kiln need be, in the vertical direction, only slightly more than one ware dimension high. But, in the lateral dimension, the kiln could be only slightly larger than one ware dimension in width, or a plurality of modules of same.

In the tunnel kiln operation, one pallet, on which there is at least one piece of green ware, pushes the pallet in front of it. In the alternative, each pallet, in a string of pallets, is temporarily connected to the pallet in front and back of it, and the thus formed string or train of pallets with the attendant ware resting thereon, are traversed through a tunnel kiln by a pulling force. Such a force, naturally, would be exerted from the terminus of the kiln out of which the finished ware is extracted. Pushing cars or pallets through a tunnel kiln has its problems. Pulling a train of cars is always easier and virtually wreck-free, whereas, in comparison, pushing a string of cars gives rise to numerous problems, the main one being a sensitivity to wrecks and consequential kiln shut-down. It has always been a dream, a hope and a desire, of tunnel kiln operators to pull, instead of push, a train of ware bearing means through a tunnel kiln.

The operating temperatures of this invention, being in the preferred range of 1400 to 1650° F., enables the use of metallic pallets. By providing matching holes or slots near the outer edge of these pallets, connecting means can be temporarily affixed, such as a U shaped metallic member dropped into matching slot or holes of different pallets. Once the pallets are thus attached, then they are pulled through the tunnel kiln. Of course, it is quite obvious that the pallet means could also be pushed through the tunnel kiln in accordance with the common mode of commercial practice.

The foregoing description concerning the use of pallets was necessarily limited to the method of either pushing or pulling the pallets through a tunnel kiln. Basically, if the push or pull procedure is employed, this premise is bottomed on the parameter that the tunnel kiln is equipped with rollers on which the pallets can travel. This is just one embodiment, and not absolutely the preferred manner. A highly preferred manner of traversing pallets, laden with green ware, into and through a tunnel kiln is to place the ware-laden pallets on an endless high-temperature travelling belt. In this manner, the belt is positively driven from a conventional geared power source, and carries the pallets on its surface. Inasmuch as the present invention has, as one of its main features, the use of rather low temperatures, in comparison with those conventionally much higher temperatures used in the manufacture of structural ceramic ware, this use of low temperatures makes available temperature resisting metals, such as Inconel and the like, which are well known and used in travelling belts in furnaces for other purposes. Consequently, the use of a temperature resisting endless travelling metal belt is placed in a tunnel kiln and allowed to extend a predetermined distance out either end of the kiln. Pallet laden green ware is placed on the endless belt at one end, the ware plus pallet is then rapidly traversed through the entire length of the kiln and out the other end where the ware is recovered as well as the pallets. Pallets are then returned to a predetermined station for subsequent reuse.

After the ware is formed in accordance with this invention, it can easily be sprayed with ceramic coloring matter or a glaze material. The tender nature of the thus freshly formed green ware is such that only spraying is applicable to this invention. Furthermore, since the fly ash is basically a fused shale member, and most shale fires brick red due to the iron oxide in the shale, one suitable ceramic colorant made most compatible with the present invention is that disclosed in United States Letters Patent No. 2,902,739 issued to H. B. Foster. This concept entails mixing a ceramic colorant with an iron "starved" spinel and then spraying this mixture onto the surface of a piece of iron containing, red firing, piece of green ware. Upon subsequent thermal treatment, the spinel "marries" or reacts pyrochemically with the iron in the ware, thereby tying up or controlling its coloring power. This allows the attendant ceramic colorant to take effect and more effectively color an otherwise red burning piece of ceramic ware. Of course, a ceramic colorant alone could be used, but this is less effective than procedure as set forth above.

What is surprising and completely unexpected in using the ceramic colorant plus an iron deficient spinel disclosed in the aforesaid Patent No. 2,902,739, is that at the low level of thermal energy at which this invention operates, i.e. from 1400° F. to 1650° F., the colors obtained are far more brilliant and striking than that obtained at the 1800° F. and higher ranges which are disclosed in said patent. One would expect that with a higher input of thermal energy, i.e. higher temperatures, the colors obtained would be better than that obtained at lower temperature. For some completely unexplained reason, this is not what actually happens.

In order to set forth some specific embodiments that will further aid a skilled artisan to more completely understand the present invention, there is set forth herein below some examples, which are by way and manner of description and not by way of limitation, any limitations being set forth in the appended claims.

Example I

A mixture of fly ash, particle size 100%—10 mesh, frit of a PCE of 016 (fusion point approximately 1458° F.), of a particle size of 100%—100 mesh, and water were mixed to form a damp mixture that contained 4 weight percent water, and 8 weight percent frit. Such a mixture was hydrostatically pressed into green ware and said ware was placed directly onto a metallic pallet and subsequently fired to cone 016 in less than three hours followed by a cooling that lasted only one hour. Ware that had the configuration of common concrete block, possessed compressive strengths that were well above 1400 p.s.i. over the gross area, zero shrinkage, a pleasing red color, and a 5% absorption based on a 24 hour cold water soak were produced.

Example II

Essentially the same procedure was followed as set forth in Example I, except that the ceramic frit was replaced with a sodium borate of a particle size of the same 100 mesh, Tyler Standard. This sodium borate possessed a minimum of 65 weight percent $B_2O_3$ and was added dry to the fly ash particles. Some improvement in the fired properties was observed when this sodium borate was dissolved in either hot or cold water and then added to the fly ash. Since the fusion point of this particular sodium borate is 1400° F., ware formed using this material was rapidly fired to this temperature in two hours, soaked at this temperature for a half hour, and then allowed to cool in an hour's time. Ware made in this fashion and in the configuration of conventional concrete block possessed a compressive strength in excess of 1500 p.s.i., absorption based on a 24 hour cold water soak of approximately 5%, and no detectable shrinkage.

Example III

The same procedure as set forth in Example II was employed except that just after the concrete block-shaped ware was discharged from the mold, it was sprayed with an aqueous suspension of a ceramic colorant and an iron deficient spinel. Immediately thereafter, the ware was brought up to approximately 1000° F. and held there for one hour to expedite the removal of the unexpelled carbon in the fly ash, and then after this pause, the temperature was then raised by rapidly traversing the block into a 1400° F. zone in a tunnel kiln where the sodium borate was matured into a glassy matrix. The block was then forced cooled to ambient temperatures within one hour. The physical properties set forth in Example No. II were reproduced employing this procedure and the block had a brilliant ceramically attached pyrochemical color on the outside of the block.

Examples IV–VI

The same procedure as set forth in Examples I–III inclusive were carried out, replacing the hydrostatic pressing mode with the conventional dry pressing. It was observed that adequate compressive strengths e.g. in excess of the standard of 1000 p.s.i. over the gross area, no shrinkage, and 8 percent absorption based on a 24 hour cold water soak were achieved. It can be concluded from this data that the hydrostatic forming mode is apparently superior in that it gives a more even distribution of the molding throughout the material that is being molded.

Example VII

The same procedure as set forth in Example II was carried out except after the mold was closed and the molding forces were being applied, a source of vibrational energy was also applied to the mold. It was noticed that upon discharging the thus formed ware from the mold that a "skin" of water had developed on the surface of the ware and that the subsequent expulsion of this water was greatly expedited from the ware during the firing step. Here, in the forming step coupled with vibration simultaneously applied, a rigid, porous, outer mold member made from sintered metal particles was also used. The rigid outer member had within it channels or ducts which led to a connection on the outside of the mold. A vacuum was applied through these ducts or channels during the application of simultaneous molding and vibrational sources of energy. Consequently, the vibrational energy assisted in the molding of the ware as well as bringing the water to the outer mold-ware interface. As the water reached the mold-ware interface, it was effectively removed through the porous outer mold member by means of the applied vacuum. Obviously, here the actual molding forces were derived from a hydrostatic means disposed in the outer porous rigid mold member and acting positionally as a core member. Such a core member consisted of a porous, rigid inner member through which a series of ducts, hence the porosity, were constructed and attached to a high pressure hydraulic source. Disposed on the outside of this means there was an elastomeric member which received the hydraulic fluid through the duct means and then elastically transmitted this force to the mass undergoing the molding, such mass being disposed in between this elastomeric means and the rigid outer mold member. No change in fired physical properties were noticed using this mode of forming. A piece of ware, made in this fashion, was also sprayed with a much leaner aqueous suspension as used in Example III with the same results as set forth in Example III.

Another use for fly ash is found in the ceramic field in the manufacture of ceramic panels, such panels having dimensions which are on the order of 4' x 4' x 4". Of course, the aforementioned dimensions are not limits, but only descriptive of the size contemplated by such a use. Slabs that have dimensions up to 8 feet and beyond are within the concept of this invention use of fly ash. It is quite apparent in every-day life in the construction field that there is no fired ceramic unit, except sewer pipe, with bigger dimensions than that represented by those on jumbo brick, or those of the common place concrete block. A fired structural unit over 3 feet long made from ceramic material is unheard of. The reason for this is that if one were to take clay and form it into a unit larger than those that are being made in present day practice, the inherent shrinkage that would follow would ruin the finished fired ware.

Clay, in a brick shrinks both in the drying and further shrinks during firing. Depending on the particular material used, this total shrinkage, both drying and firing, is normally within the range of 8 to 14%. In a piece of ceramic structural ware that has as one of its dimensions of four feet or more, in the formed state, drying and firing shrinkage would represent, at a minimum, 3.84 inches. Obviously, this much dimensional change, from the as-formed-shape of the finished ware, is too much of a change for ceramic material. Its brittle nature is such that this amount of change in dimension completely destroys the ware itself. However, fly ash is already fired. The majority if not all of its shrinkage has already been taken out of it by its firing during its genesis. Consequently, this is one of the factors that gives fly ash an advantage over other ceramic materials, especially clay, in the making and firsing of ceramic panels.

Basically, ceramic panels are formed by taking fly ash, a ceramic binder material whose fusion point is within the PCE range as set forth above, i.e. 022 to 07, and water. These materials are mixed together and then simply cast into a mold. Such a mold may be made of either incombustible or combustible material, i.e., either of steel or paper. Either subsequent to or simultaneously with such a casting, vibrational energy is either imparted to the mold or to the material thus cast into the mold. Quite naturally, the water content of such a mixture must be higher than that contemplated in the instant disclosure for making hydrostatically formed ceramic ware from fly ash. In a casting procedure, the water content should fall within the inclusive range of 10 to 30 weight percent. After the fly ash has been cast into the desired mold and vibrated into its final shape, the mold plus the thusly formed ware is fired to the fusion point of the ceramic binder phase material. Inasmuch as the ceramic binder phase material is contemplated to be either a naturally occurring but man processed borax containing material as previously described in the block making portion of this disclosure or any of the commercially available frits examples of which are also set forth in the block making portion of this disclosure, and the balance of the mixture that is being formed and then fired is an already fired ceramic material, i.e. fly ash, any green ware formed from such a mixture can be easily fired on essentially the same schedule and in the same manner as that set forth in the firing of hydrostatically formed fly ash ware described earlier. For example, a large, cast, fly ash panel which possessed a ceramic binder phase content between 4 and 14% on a weight basis has been found to be satisfactory to achieve physical fired properties comparable to those possessed by a standard common brick. Such a panel, cast into a shape that measured four feet square in two dimensions and four inches thick was fired to the fushion point of its binder phase ceramic within four hours. What was remarkable and unexpected was two-fold, i.e. the 20% water was easily expelled with no trouble at all on this fast firing schedule, and, measuring to the nearest 16th of an inch, there was no detectable shrinkage.

As mentioned previously, the mold plus the thus cast ware is fired. There is no need to first dry a fly ash, water ceramic binder phase material before firing same and then firing the article absent its mold. This is made possible by the fact that low firing ceramic binder phase materials are being used and accordingly, during firing, low carbon ordinary steel molds are not at all affected by these firing temperatures. Naturally, paper molds could be used which are consumed during the firing of the ceramic slab. Such metal, paper or ceramic molds with the freshly cast fly ash ware therein are placed directly on a traveling belt and traversed into a tunnel kiln where thermal energy is imparted to both the ware and mold to the extent that the pyrometric cone equivalent of the binder phase ceramic is achieved.

It will be noted that the forming mixture of the instant invention contains nothing more than fly ash, water and a ceramic binder phase material whose fusion point of P.C.E. falls within the inclusive range of 022 to 07. There is the absence of a dry strength binder. Of course, this does not say that a dry strength binder cannot be used. To the contrary, this means only that a dry strength binder is not needed. In fact it is not at all necessary. However, if for some purposes it is desired, some form of common place dry strength binder, e.g. lignosulfonic, starch, flour, soluble silicates and etc. can be used.

The variations that can be practiced with the foregoing castable ceramic mixture is almost unlimited. For example, a plurality of preforms, e.g., brick batts, sewer pipe pieces and etc., can first be laid at least one layer high in the bottom of a mold. On top of this layer there is then cast a mixture of fly ash, water and a ceramic binder phase. The mass is then vibrated to complete the forming step and the composite unit is fired in the method disclosed above. This procedure results in a composite unit which is composed of a body of pyrochemically bonded fly ash that has as a surface layer a contrasting plurality of preforms also pyrochemically bonded into a unitary mass. Such a variation can be further practiced by filling, at least partially or entirely, a mold member with preforms that have either the same or contrasting fired color as that of the fly ash. On top of this randomly arranged loosely fill mass of preforms there is cast a mixture of fly ash, water and a binder phase ceramic. Vibration is then used to infiltrate the interstitial pore spaces of the first placed preforms with the fly ash, water, binder phase ceramic material. After such a piece of green ware is formed, it may be desirable to brush away portions of the fly ash mixture filling in between the preforms at or near the surface to give a desired effect.

For the sake of better words or available words that are applicable for precise description, the foregoing words are coined for descriptive purposes. The word groundmass is used hereinafter to describe that portion of pyrochemically bonded or bondable material formed by the fly ash ceramic binder phase material. Preforms that may be used in such ware fabrication, whether they be portions of ground up brick batts, sewer pipe, slag, or any pyrochemically compatible rock such as diorite, diabase, unweathered shale and etc., are hereinafter referred to as phenocrysts. Such a terminology has its comparison in the study of rocks or petrology. Here, in this field the bonding medium is called the groundmass and larger particles are called phenocrysts. So it is with man-made rocks, such as ceramic slabs, that the larger particles can rightfully be called phenocrysts and the bonding medium, i.e., the fly ash and ceramic binder phase material, is terminated as the groundmass.

When paper molds are used in the fabrication of pyrochemically bonded fly ash ceramic building slabs, it is within the domain of the instant invention to not be confined to the original shape of the original mold. After the fly ash has been cast into the mold, whether phenocrystic material is used as taught above or not, the shape of the mold can, at this time, be changed. For instance, curved surfaces can be achieved by subsequently raising one or more of the portions of the paper mold. Such a shape can be sustained by placing shims or supports under the thus deformed mold and firing the ware and mold in just that spacial configuration.

One other modification that can be practiced using the instant teachings is that metallic reinforcing members can be placed in mold member prior to casting and firing, and such a reinforced composite piece of ware can be fired. Of course, tension can be applied to such reinforcing members and stressed, pyrochemically bonded ware can be achieved in this fashion.

It is important, at this point, to note that aside from the ceramic binder phase material, all of the materials used in the aforementioned casting process has been previously fired. Even the ceramic binder phase, when ceramic frits are used, are pre-fired materials. Only when the man-processed borax (Rasorite) materials are used in a non-fired material contemplate. Phenocrystic material, the preforms, should be material that has a Pyrometric Cone Equivalent that is in excess of cone 07, the later being the highest cone contemplated in this inventive concept. Furthermore, phenocrystic material is envisioned to be appropriately sized pre-fired material such as crushed bricks, ceramic wall tile, sewer pipe and the like. Inasmuch as bricks come in a multitude of colors, basically these colors are variations of red and white. It is contemplated in this invention that contrasting as well as complementary colored phenocrystic material can be used in casting large slabs composed from fly ash. Red is usually the color of fly ash, as previously mentioned, is nothing more than fused shale particles and normally shale contanins an excess of 2 weight percent of $Fe_2O_3$. The iron gives the shale the red fired color since the iron is turned into the mineral hematite during firing. As any mineralogist knows, hematite is red in color. In view of the foregoing, red phenocrystic material can be used with red firing or white phenocrystic material can be used with the red burning fly ash material. Quite naturally, the groundmass mixture, the fly ash ceramic binder material, can be pyrometrically colored by means of mixing therewith either a ceramic colorant or a ceramic colorant along with an "iron starved spinel." Upon firing, even at the low temperatures as set forth, the iron starved spinel marries with the iron in the fly ash, and allows the ceramic colorant to impart a pyrochemical color to the ground mass per se.

As was the case in ceramic ware formed from fly ash-ceramic binder phase materials, the mixture formed therefrom is harsh, gritty, and definitely non-plastic. Such a mixture mixed with water, formed and then dried has, in its green state, little or no dried strength. Basically this is true because there is no clay or clay-like particles in such a mixture. As has been previously mentioned, a dry strength binder may, if desired, be used to impart a degree of dry strength to the green case ware. However, since it is possible to fire and pyrochemically bond such cast ware to temperatures that are no higher than cone 07—temperatures in actual practice average around 1400 to 1600° F.—mold materials, such as ordinary low carbon hot rolled steel can be used to contain the thus cast ware during the entire process of firing. Accordingly, except for special purposes, a dry strength binder is of no use or importance when firing in a mold; hence, the most economic use is to delete the use of dry strength binder.

As has been demonstrated, the larger the ceramic article, the less likely one expects to have a unitary article at all upon firing same. Shrinkage is the main and most important item. A dimensional change of 3.84 inches in a piece of ceramic ware which, possesses one dimension of approximately four feet, is, at first glance, catastrophic to the pyrochemical vitreous bond that is developed during firing. Basically, there are just too many strains developed during firing for the ware to remain in one piece. As a result, ware not made in accordance with this invention usually winds up, in the fired state, in a plurality of pieces, not a single unitary mass. Ordinary experience forms a basis for this conclusion since the only large structural slabs that are now available to the construction trade are those that are made from hydraulic concrete. These slabs also shrink in service, and it is only by metal tension means that they can be made load bearing and stable during the life of a building in which they are formed. Ceramic slabs would need no such metallic reinforcing means, even though they could be furnished with same, and they would be as chemically and dimensionally stable as an ordinary brick during service. In fact, it has been found that ceramic slabs made according to the present invention have a compressive strength in excess of 2,684 p.s.i. and an absorption, based on a 24 hour soak, of only 5%. Most brick have similar properties. However, most brick are limited in size to the conventional common place size. Ceramic slabs are not so limited.

The concept of extruding a column of fly ash, even with a water content of ten weight percent or even to twenty weight percent presents an interesting embodiment. Here the water is used mainly, primarily and only for the forming of ware. This particular method of forming (extrusion) requires a "degree" of plasticity. A degree of plasticity can be achieved with materials that are not thought of as normally plastic materials by grinding the particles to a fine particle size. Small particles plus a fluid medium, such as water, gives rise to a mixture that has enough plasticity to extrude. Consequently, fly ash particles of a fine particle size, say −100 mesh. Tyler Standard, plus water, preferably around a weight percent of 10 to 20 percent, results in a mixture that will extrude. But, this large amount of water in the ware slows down the firing schedule since this "extra" amount of water must be removed. "Extra" water content here is spoken of in comparison to the normally 5 weight percent that it takes to form ware by either conventional dry pressing or hydrostatic means. This, then, presents the problem of an extra 5 to 10 weight percent water that must be removed before the water content of dry or hydrostatic pressed ware is reached. Naturally, this slows down any firing schedule since this water has to be removed.

As it has been previously suggested, vibrational energy applied to a column that is being extruded brings the water in the column to the die-column interface. It has been observed that a fluid in a fluid-solids system will seek the source of any applied energy in the form of vibration. Consequently, since the main, if not sole, source of frictional resistance of a column that is being extruded is at the die column interface, it naturally follows—if vibrational energy were used to bring and concentrate, what fluid medium that was being used as an extrusion medium, to that very spot where the resistance to extrusion was taking place—that extrusion would be enhanced. But, even though extrusion is enhanced, this does not solve the problem of the water in the ware. This water still has to be removed.

The prior art teaches the concept of putting ultrasonic vibrators on extrusion dies; yet, the prior art still removes the water in the ware in the same fashion as before, i.e. drying by thermal means after the ware has been formed.

It has been found that, by means of a porous extrusion die member, which also has mounted on said die member an ultrasonic vibration means, a column of material can be forced through such a die member while vibrating the die. Naturally the vibrations bring what water there is in the column to the surface, i.e. to the column ware interface. And, as the water does reach such an interface, instead of just leaving it there, consequently blocking the possibility of additional water coming to that very same interface, a vacuum is applied to the porous die member removing excess water as it accumulates at the die-column interface. Naturally, such a porous die member and embedded vacuum members therein is operated in conjunction with the column being extruded therethrough in such a manner that the flow of water from the inside of the column to the outside, i.e. is the die-column interface, is just sufficient at all times to permit the desired extrusion. Yet, as excess water is accumulated at this interface, excess water that is not necessary for extrusion and to overcome the frictional resistance of the column as it passes through the die member, this excess is removed continuously as the column passes through the die member. In this manner, ware, as it emerges from the porous, vibrating die member, emerges with the majority of the water removed from it, and, what water is still residual in the ware is really just on the outer skin of the thus extruded ware and just enough to slide the ware through the die member. As a result of this remaining water being close to the surface of the ware, there need be only a minimum of thermal energy applied to drive off this last remaining residual water.

Of course, it is immediately obvious that from the foregoing that the die member can be heated, if it be so desired, by conventional heating means. The die means can be constructed out of any suitable material such as sintered metals, ceramics and plastics. Even plaster-of-paris can be used. However, the preferred embodiment envisions using sintered metal particles, the interstitial pore spaces between the metal particles being of a size that is smaller than the smallest particles used in the extruded column. Also, it has been found that die members employing plastic materials, such as epoxy and polyamids, have been found to be adequate and almost equal to metal die members since these die members can be heated to 100° C. if need be as well as those die members made out of metal particles or ceremet particles. Because of the constant severe attrition resulting from the frictional abrasion at the die-column interface, plaster-of-paris, a porous material used extensively in slip casting where porous mold members are needed, was not found to be as satisfactory as the die members made from plastic and metal particles. However, this does not preclude the use of dies constructed from such a material. Quite obviously, ceramic die members, which are also porous could also be used.

Since it is now in vogue to investigate "hot" extrusion, it was found that if the water added to the column were heated to say 50 to 100° C. and along with the heated water a small amount of $NH_3OH$ (.01–2% by weight)

were also added, the ammonia hydroxide acted as a water "extender" in that it cut down on the actual amount of water needed, and, the pre-heating of the water before mixing it with the raw feed to an extruder resulted in much faster schedules of removal of what water that was left on the outside of the ware. Hot water and wetting agents, such as ammonia, have been used in the past, yet these two "agents" helped greatly the basic concept of using as little water as needed and drying what water there was left in the ware after extrusion as fast as possible.

By way of summary, the disclosure, as set forth, recognizes a plurality of problems and offers solutions for them all. First a market place is found for the tons and tons of accumulated unwanted fly ash. Second, a novel method of rapidly forming structural ceramic ware from harsh, gritty, non-plastic material such as fly ash has been shown to be production practical in a manner heretofore never envisioned by the prior art. Basically, an unwanted, cursed harsh gritty, non-plastic, fine grained fly ash is mixed with a small amount of inexpensive low melting frit material that has a PCE, which is within the range of 022 to 07. Water is added to reach an approximate weight percent water content of 5–8%, and structural ware is formed from such a mixture either by dry pressing or hydrostatic means. The thus formed ware is thereinafter deposited from the mold cavity directly onto a pallet and said pallet is then traversed through a firing schedule in a rapid fashion, essentially around 4 hours or less. Structurally sound ceramic ware can thus be produced and made ready to be placed in a wall within the unheard of time of less than half working shift; whereas, in commercial brick manufacture or concrete block production, it takes at least three days to produce a similar piece of ware. From the foregoing, the advantages are compellingly obvious.

As is known, ceramic products can be produced having inherent physical properties which could, as a composite article, recommend their use in certain fields such as for floor and wall panels used in building construction. Modern construction technology requires panel or slab units of relatively large dimensions as for example, 2' x 4', 4' x 4', and 4' x 8' and even larger. At the present time this field is practically pre-empted by competing products such as precast concrete and metal panels. Although metal or concrete panels can be made up in virtually any desired size, they are undesirable from the standpoint that when formed as comparatively large panels they do not possess the strength to constitute load bearing members in a building or other structure.

Prior to this invention, ceramic compositions were found to be unsuitable for making load bearing panels or slabs of the comparatively large size mentioned above mainly for two reasons. One reason was the considerable shrinkage encountered in making such large sized units; the other was the comparatively poor strength of the fired ware.

Thus, another aspect of the invention is the concept of utilizing as the principal aggregate or adherent in the concrete unit a previously fired particulated ceramic material such as brick, structural tile, and other fired argillaceous products. Such materials are peculiarly well suited to serve as strength-and-bulk-imparting components of the ceramic concrete composite. Because of their prior thermal history such particulated products are chemically inert and present a surface structure which is most conducive to the establishment of a strong bond with the ceramic matrix. Because of their physical characteristics, stemming in large part from their thermal history, such aggregate materials not only impart high strength to the final as-fired product but also contribute to a favorable thermal expansion coefficient and very low moisture expansion. Because of their relatively low specific gravity as compared to typical heavy weight concrete aggregates they similarly contribute to the high strength-weight ratio as compared to competitive cast concrete units. As will be seen more fully hereafter the use of such particulate ceramic materials as aggregates in the novel concrete permits the development of a wide range of color gradations and concomitant unusual aesthetic effects in the finished ceramic concrete unit. The great economic advantage deriving from the use of such particulate material is apparent when it is considered that such aggregate is available in great quantity as a by-product waste for brick and tile manufacture.

The method of producing the novel ceramic concrete units essentially involves the steps of molding or forming a shape of a formable mixture of a ceramic aggregate and a ceramic bonding agent and firing the preform at a suitable temperature and time to produce the final, matured concrete unit.

The forms into which the aggregate-cement mix is introduced may be of any pre-selected size and shape and can be arranged in such a manner as to give special contours or shapes, relief patterns, recesses or keyways for reception of as-cast fittings or for fastening the finished panels to structural members. Such forms may be of any desired material such as wood, steel, plaster of Paris, paper, porous cardboard and the like, and may be, if desired, suitably surfaced or coated with a release agent such as oils, waxes, silicones and the like. In the use of this type of permanent form the panel is dried therein and removed if desired (but necessarily so) prior to firing. In a preferred method, particularly where simple shapes are to be made, the form may be constituted of paper or cardboard of a suitable wet strength and caliper and the entire unit, i.e., the paper form and its retained mix is introduced into a furnace (or reshaped before firing) and supported on fire brick or kiln furniture so that the paper is burned off during the firing operation. If desired the forms may be permanent forms of suitable metallic pallet or refractory structure, surfaced with release or parting materials, which forms, are a part of the actual firing equipment such as the tops of tunnel kiln cars or traveling belts.

Operating under the principles of the invention, structural ceramic concrete units of any practical surface area and cross section or thickness may be produced quickly and economically, which units adequately fulfill the specifications for structural building units. Thus panels of nominal dimensions 2' x 4', 4' x 4', 4' x 8', and even larger may be readily produced. The thickness may be varied as desired, depending upon structural requirements, as for instance one inch thickness for small veneer panels up to nominal four inches or more for large panels called upon to resist wind stresses and/or other forces involving either lateral or vertical loads. In the method of the invention, unlike prior methods of forming ceramics, no size limitations are imposed on the molding or shaping equipment and the only possible size limitation is indicated by the capacity of the tunnel kilns or other firing furnaces in which the pre-shaped ceramic cement units are finished. As is known, the capacity of currently employed tunnel kilns are more than adequate to accommodate presently specified or any foreseeable larger sizes of preformed ceramic concrete structural building elements.

Generally considered the aggregate may comprise from about 50% to about 95% by weight, and the binder from about 5% to 50% by weight of the mix. A typical batch consists of large and small particles of crushed brickbats, of essentially 100%—14 mesh Tyler Standard. It has been found that ceramic concrete units of excellent strength may be produced using an aggregate comprised of about 20% through 200 mesh, a similar amount of between 100 and 200 mesh with the remainder comprised of larger particles.

In carrying out the invention a batch of crushed brickbats of the general particle size and particle size distribution noted above is admixed with the binder in a pre-selected proportion to be described in detail later on, such as, for example, of about 33 parts of the binder to 100 parts of aggregate, for a period of time sufficient to fill the voids between the aggregate particles. This will be described in detail later on. The resulting mix described above is then poured into any conventional mold such as is ordinarily used in casting or molding concrete articles or preferably into a disposable mold such as a panel mold comprised of relatively heavy, high wet strength paper supported in a suitable frame; the mix is screeded and tamped or vibrated to fill the mold and dried to the desired consistency. The panels are then passed through a kiln on cars, a conveyor or the like and fired to achieve the PCE of the binder phase.

Most ceramic units, like a brick, are a composite of individual granules, which upon firing, pyrochemically unite one to another to form a composite unitary unit. The individual particles, by their very nature, form an arrangement that is a function of the particle size distribution and/or particle packing. The term particle size distribution has the connotation that there is a certain percentage of medium size particles, plus a balance of particles which are called fines. To explain the relation of these particles, one to another and the ultimate composite mass that could be made from such, reference is made to an imaginary block of material, which for the purpose of example only, is assumed to be completely absent of any void space. A cubic foot block of igneous rock would do as such an example. Subjecting this block of rock to a normal crushing operation would then result in the aforementioned coarse, medium and fine fractions.

If the coarse fraction, per se, were to be put into a given container, it is immediately observable that these coarse particles occupy a certain gross space or volume. This is called apparent volume. This gross space, or apparent volume, includes not only the space actually taken up by the particles themselves, but also interstitial space caused by the random packing or three dimensional arrangement of the particles. Upon the removal of the coarse particles from the container, the subsequent mixing of these coarse particles with the fine and medium fractions, and the subsequent placement of this mixture back into the same container, it will be observed a definite new change, over and above that of the original 1 cubic foot block originally set out as the starting material. The increase, is nominally 30%, i.e. there would be expected then about 1.3 cubic feet of space occupied by the coarse, medium and fine fraction mixture. Yet, all of this material only originally occupied 1 cubic foot. Therefore, the 1.3 cubic feet of gross or apparent space now occupied is actually occupied or created by (a) the actual particles themselves and (b) the void space created by the packing of the particles. By crushing the original 1 cubic foot block of rock, there has been created one large three dimensional "jig-saw" puzzle. Theoretically, it is possible to fit each and every particle back into its three dimensional space. Practically speaking, this is all but impossible.

However, by selective grinding and mixing of predetermined percentages of selected size fractions, interstitial space created by a relatively coarse fraction, or coarse plus medium fraction, can be substantially filled with a judiciously graded mixture of medium and/or fine particulate material. The apparent volume occupied by the aforementioned or proposed mixture would be essentially the same as that apparent or gross volume occupied by the previously identified coarse fraction.

Accordingly, in carrying out one embodiment of the instant invention, it is contemplated that a coarse fraction, e.g. that portion of brick bat material, but not necessarily fly ash, is created by grinding brick bats to essentially 100% —14 mesh Tyler Standard. This material per se has an apparent or gross volume. This volume per se is not increased substantially upon the addition of a particulate ceramic binder phase material to it. The ceramic binder phase particulate material is in such an amount and in such conjunction with a chosen particle size distribution that the void space created by the —14 mesh material is essentially filled up; yet there is no apparent significant increase in total or apparent original volume. Accordingly, this mixture's total particle size distribution, i.e. brick bat material (—14 mesh) mixed with the ceramic binder phase material, is such that there is a total particle packing effect wherein there is essentially no void space left unoccupied in the unfired state. This optimum particle packing effect is achieved through a custom making of a particle size distribution and results in a fired unit that makes optimum employment of the pyrochemical bond achieved upon firing of the molded mixture. Load bearing units are then achievable through this procedure.

It has then been found that when a mixture, such as that listed below:

| | Wt. percent |
|---|---|
| —1" ¾" preforms | 48.2 |
| —14 mesh brick grog | 24.1 |
| P-926 frit (—100 mesh) | 12.1 | that a load bearing structure was realized when fired to the P.C.E. of the frit material. The preforms, i.e. the —1" ¾" fraction, were first placed in a mold essentially one preform thick. This resulted in a layer of preforms over the bottom of a mold. Upon the top of this one preform thick layer there was cast a mixture of frit and —14 mesh brick grog in a water slurry. The amount of water was 15.7 wt. percent. This percentage was of the total, i.e. preforms, —14 mesh brick grog, frit and water. The —14 mesh brick grog was a graded mixture, the maximum upper size being particles that would essentially pass a —14 mesh screen.

| Tyler standard sieve: | Percent retained |
|---|---|
| 14 | 0 |
| 20 | 17.2 |
| 35 | 23.0 |
| 48 | 2.0 |
| 65 | 12.5 |
| Pan | 45.3 |

The frit material was essentially the commercial —100 mesh particle size customarily used. However, the amount of frit material in conjunction with the size of the frit was found to fill up the interstitial spaces formed by the particles making up the —14 mesh grind.

By way of contrast, the particle packing of the above described mixture is a closely packed three dimensional arrangement when it is compared to that frit-aggregate combination in U.S. Patent No. 1,929,425 to Herman. This patentee's particle packing is designed to create void spaces because the ultimate goal of this patent teaching is the making of acoustical, i.e. sound absorbing, tile members. Obviously, the acoustical tile of Herman is nowhere near the load bearing propensity as structures made by the process of the instant disclosure. This would be like a comparison of a vesicular insulating brick and a dense hard-burned non-vesicular brick. In essence, there is no comparison in relation to the load bearing properties.

It will be noted at this point that the green, dry and fired strength and shrinkage of ceramic bodies comprehended by the present invention are affected by the water content of the moldable mix. Thus in preparing a batch of aggregate and binder for molding into a slab or other shape the mixture should be wet enough to obtain the desired strength and to permit the forming, if desired, of a textured appearance on the upper surface.

The panels produced as described may be and preferably are ground or cut with a masonry saw to display the aesthetic aggregate pattern to the best advantages. It will be perceived that the described method of producing building panels makes it possible to produce a variety of unusual aesthetic effects in the finished terrazzo-like product. Varigated color combinations may be achieved by selecting ceramic brickbat starting materials of specifically different natural colors or such starting material may be comprised of fired brick aggregates the color of which has been permanently altered to off white, or brown, blue green and the like, as for example, by the method described in my U.S. Patent No. 2,902,739. The potential range of color contrasts and gradations in the finished panel may be further expanded by incorporation of selected ceramic colorants such as metallic oxides, stains and the like in the binder matrix.

Without limiting the scope of the invention the following examples illustrate the advantages of involving the concepts thereof:

Example I

A moldable mix, produced in the manner previously described, was made comprised of 62.5% of −14 mesh buff brick grog, 20.8% of sodium borate and 16.7% water. This mixture was formed in molds and fired at a temperature of 1600° F. for a period of approximately four hours. The resultant ware under test was found to have a transverse rupture strength of 1300 p.s.i. and an absorption 24-hour soak of 11.1%. In this test the bottom of the mold was first coated with −¾″ plus ⅜″ aggregates, about one inch deep and the above dry backing material was dusted inbetween the aggregated mass. Water was then added to the dry material, mixed and vibrated into place on top of the large aggregates. The resultant material was a veneer-type slab.

Example II

In another typical example, a mix of 48.12% of −1″ plus ¾″ brick grog, 24.1% −14 mesh grog, 12.0% P–926 frit (obtained from Pemco Corporation, Baltimore, Maryland), and 14.5% of water. This mix was molded and then brushed to remove superficial fine aggregate between the larger aggregates to thereby create a relief-like texture, and the molded product was fired at a temperature of 1500° F. for a period of about four hours. The completed ware had a transverse rupture strength of 1045 p.s.i., a compressive strength of 2684 p.s.i. and a 24-hour absorption soak of 10.5%.

It will be appreciated that ceramic materials of the type described herein provide excellent aggregate for the ultimate ceramic concrete. Because of the prior thermal history they are devolatilized and denuded of the organic matter and present a type of roughened surface to which the glassy matrix strongly bonds both by reason of the specific bond of binder to aggregate and the embedment of the differentially sized and randomly orientated aggregate particles in the cured material.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a method of making pyrochemically bonded ceramic structural ware, the steps comprising:
   (a) providing a mixture of fly ash, water, and a ceramic binder phase material whose Pyrometric Cone Equivalent falls within the inclusive range of 022 to 07;
   (b) forming said mixture into a piece of unitary green ware; and subsequently
   (c) firing the thus formed ware to the Pyrometric Cone Equivalent of the binder phase ceramic.

2. The method defined in claim 1 wherein said ware is (a) formed by casting said mixture into a mold and (b) is fired while in said mold.

3. The method defined in claim 2 comprising the step of vibrating said mold during the step of forming said ware.

4. The method defined in claim 2 wherein said mold is consumed during the firing of said ware.

5. The method defined in claim 1 comprising the step of placing the formed, green ware on a pallet, said ware being fired while on said pallet.

6. The method defined in claim 1 wherein said binder phase ceramic is selected from the group consisting essentially of ceramic frits and naturally occurring sodium borates.

7. The method defined in claim 1 wherein the water content of said mixture falls within the inclusive range of 4–10 weight percent, and wherein the binder phase ceramic in said mixture falls within the inclusive weight range of 4 to 12 percent.

8. The method defined in claim 1 wherein the fly ash mixture is hydrostatically formed prior to firing.

9. A method of producing lightweight structural ceramic ware the steps of:
   (a) providing a mixture consisting essentially of −10 mesh, Tyler Standard, mesh fly ash particles, water within the inclusive weight range of 4 to 10 percent and a low melting binder phase ceramic having a particle size is essentially −100 mesh, Tyler Standard and having a Pyrometer Cone Equivalent that falls within the inclusive range of 022 to 07;
   (b) forming the aforesaid mixture into a piece of unitary green ware;
   (c) placing the thus formed green ware directly on a pallet means, and then subsequently;
   (d) firing the ware and pallet means to the Pyrometric Cone Equivalent of the low melting binder phase ceramic.

10. The method defined in claim 9 wherein, after step (c) and before step (d), the thus formed green ware is sprayed with a fluid suspension of ceramic materials selected from the group consisting of ceramic colorants and a mixture of a ceramic colorant and an iron deficient spinel.

11. The method defined in claim 9 wherein, in step (a), the low melting binder phase ceramic is selected from the group consisting of ceramic frits, sodium borates, and mixtures thereof.

12. A method of producing pyrochemically bonded ceramic panels comprising the steps of:
   (a) providing a mixture of fly ash, water and a binder phase ceramic whose Pyrometric Cone Equivalent falls within the inclusive range of 022 to 07, the water content falling within the weight range of 5 to 30% and the ceramic binder phase content falling within the weight range of 4 to 15%;
   (b) vibrationally casting said mixture into a mold; and
   (c) firing the thusly cast ware to the Pyrometric Cone Equivalent of the binder phase ceramic.

13. In a method of producing pyrochemically bonded ceramic panels, the steps comprising:
   (a) providing a mixture of fly ash, water within the weight range of 5 to 30%, and 4 to 15 we ght percent of a ceramic binder phase material whose Pyrometric Cone Equivalent falls within the inclusive range of 022 to 07;
   (b) placing ceramic preforms within a mold whose random size is larger than that of the fly ash particles and whose Pyrometric Cone Equivalent is in excess of 07;
   (c) casting the fly ash mixture into said mold and filling up any interstitial spaces created by said randomly disposed preforms; and
   (d) firing the thus formed green ware to the Pyrometric Cone Equivalent of the binder phase ceramic.

14. The method defined in claim 13 wherein the mold is completely filled with ceramic preforms prior to casting fly ash material into said mold.

15. The method defined in claim 13 wherein both the ware and the mold are fired simultaneously to the Pyrometric Cone Equivalent of the binder phase ceramic.

16. The method defined in claim 15 wherein the mold is consumed during firing.

17. The method defined in claim 16 wherein said mold and freshly cast ware are deformed after the casting step and prior to the firing step.

18. In a method of producing lightweight structural ceramic ware comprising the steps of:
 (a) providing a mixture consisting essentially of fly ash, water, and a low melting binder phase ceramic whose Pyrometric Cone Equivalent falls within the range of 022 and 07;
 (b) disposing said mixture between a porous, rigid, outer mold member and an inner elastomeric mold member;
 (c) closing said mold; and
 (d) simultaneously hydraulically forming green ware from said mixture and extracting at least a portion of the forming water therefrom by
   (i) applying vibrational energy and a vacuum to the outer porous mold member and
   (ii) simultaneously hydraulically applying a molding force to the elastomeric mold member;
 (e) relaxing the molding force to retract the elastomeric mold member away from the thus formed green ware;
 (f) opening the mold;
 (g) stripping the thusly formed green ware directly on a pallet means; and
 (h) firing the green ware and pallet means to the Pyrometric Cone Equivalent of the low melting binder phase ceramic.

19. A composition of matter consisting essentially of fly ash, water, and a low melting binder phase ceramic whose Pyrometric Cone Equivalent falls within the inclusive range of 022 to 07.

20. The composition of matter defined in claim 19 wherein the water content falls within the inclusive weight range of 4–10 percent and wherein the low melting ceramic binder phase ceramic content falls within the inclusive weight range of 4 to 12 percent.

21. The method defined in claim 1 wherein said mixture consists essentially of said fly ash, said water, and said ceramic binder phase material.

22. A method of making a load bearing structural unit comprising the steps of:
 (A) providing a ceramic refractory phase particulate material having a PCE greater than cone 08 and of a particle size distribution such that voids are created between said particles,
 (B) providing a ceramic binder phase material the PCE of which falls within the inclusive range 022 to 012,
 (C) the particle size distribution and amount of said binder phase material being no less than that which will fill said voids created in said refractory phase material upon adequate mixing of the two materials,
 (D) mixing said refractory and binder phase materials along with a fluid medium to achieve the filling of said voids with said binder phase material,
 (E) casting the thusly formed mixture into a mold, and
 (F) firing said mixture in said mold to the PCE of the binder phase material.

23. The method defined in claim 22 wherein said refractory phase material is essentially 100% −14 mesh Tyler Standard.

24. The method defined in claim 22 wherein said binder phase material is essentially 100% −100 mesh Tyler Standard.

25. The method defined in claim 22 comprising the step of applying vibrational energy to said mixture during molding.

26. The method defined in claim 22 wherein the mold is made of combustible material which is consumed during firing of the molded mixture.

27. The method defined in claim 26 wherein subsequent to the molding step, both the mold and the mixture therein are reshaped before firing.

28. The method defined in claim 22 wherein ceramic preforms, the size of which is substantially greater than the largest refractory phase particle and the PCE of which is at least that of said refractory phase material, are provided separately of the mixture in step (D) and are distributed as a layer in the mold before the casting of said mixture in step (E), whereby the mixture is cast in step (E) over said layer.

29. The method defined in claim 28 wherein the fired color of the preforms and castable mixture are different.

30. The method defined in claim 22 wherein the mixture in said mold is placed in a kiln for firing in a wet state.

31. The method defined in claim 22 wherein said mixture is fired to the PCE of the binder phase material and wherein the resulting ware is cooled to a handable temperature in no more than 8 hours.

32. The method defined in claim 22 wherein said mold with the mixture cast therein is passed through a kiln for firing on a travelling belt.

33. The method defined in claim 22 wherein said mixture is free of dissolved materials selected from the group of organic and silicate materials.

References Cited

UNITED STATES PATENTS

| | | | |
|---|---|---|---|
| 1,650,080 | 11/1937 | Lefebvre | 106—84 |
| 1,707,395 | 4/1929 | Hyde | 106—40 |
| 1,929,425 | 10/1933 | Hermann. | |
| 2,576,565 | 11/1951 | Brown. | |
| 2,656,281 | 10/1953 | Wasserman | 106—84 |
| 2,805,448 | 9/1957 | Rubenstein. | |
| 2,877,125 | 3/1959 | Duplin | 106—67 |
| 2,949,704 | 8/1960 | Jacobs. | |
| 3,053,694 | 9/1962 | Daunt | 106—84 |
| 3,132,955 | 5/1964 | Nameishi | 106—67 |
| 3,143,433 | 8/1964 | Blair | 106—84 |

OTHER REFERENCES

A Literature Review of the Utilization of Fly Ash, Littlejohn, 1954, all pages.

ROBERT F. WHITE, *Primary Examiner.*

J. A. FINLAYSON, *Assistant Examiner.*